United States Patent
Fouche et al.

(10) Patent No.: US 11,724,770 B2
(45) Date of Patent: Aug. 15, 2023

(54) CYCLING CLEAT AND A CYCLING PEDAL

(71) Applicant: KF CYCLING PTY LTD, Victoria (AU)

(72) Inventors: Michael Craig Fouche, Melbourne (AU); Antoni Ryszard Kowalewski, Melbourne (AU)

(73) Assignee: KF CYCLING PTY LTD, Victoria (AU)

( * ) Notice: Subject to any disclaimer, the term of this patent is extended or adjusted under 35 U.S.C. 154(b) by 0 days.

(21) Appl. No.: 17/587,416

(22) Filed: Jan. 28, 2022

(65) Prior Publication Data

US 2022/0153383 A1    May 19, 2022

Related U.S. Application Data

(63) Continuation of application No. 16/500,915, filed as application No. PCT/AU2018/050307 on Apr. 4, 2018, now abandoned.

(30) Foreign Application Priority Data

Apr. 4, 2017    (AU) ................................ 2017901217

(51) Int. Cl.
| | |
|---|---|
| *B62M 3/08* | (2006.01) |
| *A43B 5/14* | (2006.01) |
| *A43C 15/02* | (2006.01) |

(52) U.S. Cl.
CPC ............... *B62M 3/086* (2013.01); *A43B 5/14* (2013.01); *A43C 15/02* (2013.01)

(58) Field of Classification Search
CPC .................................. A43C 15/02; A43B 5/14
See application file for complete search history.

(56) References Cited

U.S. PATENT DOCUMENTS 2,002,556 A * 5/1935 Irl ........................ A43C 15/167
                                                            36/67 D
2,412,788 A   12/1946 Vietas et al.
(Continued)

FOREIGN PATENT DOCUMENTS

| CN | 1407249 A | 4/2003 |
|---|---|---|
| EP | 2 121 422 A1 | 11/2009 |

(Continued)

OTHER PUBLICATIONS

International Search Report and Written Opinion of the International Searching Authority for International Patent Application No. PCT/AU2018/050307 dated May 25, 2018, 8 pages.

(Continued)

*Primary Examiner* — Vinh Luong
(74) *Attorney, Agent, or Firm* — Merchant & Gould P.C.

(57) ABSTRACT

A cycling footwear cleat for connection to a receiving portion of a pedal is shown. The pedal includes a mounting shaft to which the receiving portion of the pedal is rotatably mounted. The cleat including: a mount for mounting the cleat to an underside of cycling footwear; an attachment portion for receipt by the receiving portion of the pedal; and a resilient member provided between the attachment portion and the receiving portion when the pedal is attached to the cleat. The resilient member resists movement of the attachment portion relative to the receiving portion. The resilient member improves a cyclist's pedalling efficiency, as well as allowing for variable float of the cleat within the pedal as and when required.

3 Claims, 6 Drawing Sheets

(56) References Cited

U.S. PATENT DOCUMENTS

| | | | |
|---|---|---|---|
| 4,899,618 | A | 2/1990 | Christol |
| 5,079,968 | A | 1/1992 | Stamer |
| 5,692,323 | A | 12/1997 | Goldberg |
| 5,860,330 | A | 1/1999 | Code et al. |
| 6,035,559 | A | 3/2000 | Freed et al. |
| 6,299,192 | B1 | 10/2001 | Bryce |
| 6,331,007 | B1 | 12/2001 | Bryce |
| 6,494,117 | B1 | 12/2002 | Bryne |
| 7,178,272 | B2 | 2/2007 | Xie |
| 7,219,451 | B2 | 5/2007 | Chretien |
| 8,272,150 | B2 | 9/2012 | Bryne |
| 8,646,359 | B2 | 2/2014 | Hsieh et al. |
| 10,517,349 | B2 | 12/2019 | Marti |
| 2005/0188567 | A1 | 9/2005 | Chretien et al. |
| 2007/0084086 | A1 | 4/2007 | Bryne |
| 2007/0094898 | A1 | 5/2007 | Xie |
| 2012/0066935 | A1 * | 3/2012 | Opie ............... A43B 5/185 36/135 |
| 2012/0132030 | A1 | 5/2012 | Kamada |
| 2013/0312569 | A1 | 11/2013 | Hsieh et al. |
| 2015/0291252 | A1 | 10/2015 | Coderre |
| 2016/0304156 | A1 | 10/2016 | Pepito |
| 2020/0062338 | A1 | 2/2020 | Hsieh |
| 2020/0094915 | A1 | 3/2020 | Chen |
| 2022/0015504 | A1 * | 1/2022 | Alcorn ............. A43B 13/223 |
| 2022/0204125 | A1 * | 6/2022 | Huang ............. B62M 3/086 |

FOREIGN PATENT DOCUMENTS

| | | | |
|---|---|---|---|
| JP | H05-111402 A | 5/1993 | |
| JP | H05-76303 U | 10/1993 | |
| JP | 2000-355294 A | 12/2000 | |
| JP | 2013-233928 A | 11/2013 | |
| JP | 2017-503602 A | 2/2017 | |
| KR | 10-1350559 B1 | 1/2014 | |
| WO | WO 9709228 * | 3/1997 | ............. B62M 3/086 |
| WO | 2016/063073 A1 | 4/2016 | |

OTHER PUBLICATIONS

EPO Machine Translation of KR 101350559 (B1), Choi Jin Young, Jan. 13, 2014 (Year: 2014).
Extended European Search Report for corresponding European Patent Application No. 18781122.9 dated Nov. 24, 2020, 11 pages.
Derwent Abstract of U.S. Pat. No. 8,646,359 of Hsieh, Feb. 11, 2014 (Year: 2014).
Definition of able, Merriam-Webster.com, Dec. 22, 2020 (Year: 2020).
Able definition suffix, Googe Search, Dec. 22, 2020 (Year: 2020).
Examination Report for Eurasian Patent Application No. 201992357 dated Jun. 16, 2021, 2 pages.
Chinese Office Action for Chinese Patent Application No. 201880036873.4 dated Jul. 25, 2021, 9 pages.
Japanese Office Action for Japanese Patent Application No. 2019-554520 dated Oct. 13, 2021, 4 pages.

* cited by examiner

PRIOR ART

FIG. 6A

PRIOR ART

FIG. 6B

PRIOR ART

CYCLING CLEAT AND A CYCLING PEDAL

CROSS-REFERENCE TO RELATED APPLICATIONS

This application is a Continuation of U.S. patent application Ser. No. 16/500,915, filed 4 Oct. 2019, which is a National Stage Application of PCT/AU2018/050307, filed 4 Apr. 2018, which claims benefit of Serial No. 2017901217, filed 4 Apr. 2017 in Australia and which applications are incorporated herein by reference. To the extent appropriate, a claim of priority is made to each of the above disclosed applications.

INTRODUCTION

The present invention relates to cycling. More particularly, the invention relates to an improved cycling cleat for attachment to cycling footwear, and so will hereinafter be described generally in this context. The invention has particular application in the context of a cleat designed for road bike use, and so will hereinafter be described generally in this context. However, it is to be appreciated that the invention may also have application to other cycling disciplines, including (but not limited to) commuting, time trial, triathlon and track bikes.

The invention also relates to a cycling pedal.

BACKGROUND TO THE INVENTION

Conventional bicycle pedals and cleats are provided in a myriad of specific designs, with manufacturers usually adopting a unique look for their pedals and cleats to visually distinguish them in the market place.

Regardless of the pedal/cleat combination used by a cyclist, their primary function is to prevent the shoe of a cyclist inadvertently separating from the pedal, which can be dangerous, as well as resulting in a temporary loss of pedalling motion.

Pedal designs are usually configured for use with a specific cleat design. In some instances, however, a given pedal may be used in conjunction with any one of a small range of cleat designs. Each cleat within the range may offer the purchaser unique performance characteristics, thereby allowing the purchaser to select the cleat most suited to their needs.

Cleat designs offer varying amounts relative movement between the pedal and cleat. Some movement is often desired, in part, to reduce the likelihood of a cycling induced knee injury, and so this style of cleat is favoured by many cyclists. Other cyclists, though, including some elite and professional cyclists, prefer to have little or no relative movement between the pedal and cleat and so select a cleat design that satisfies their requirements.

While existing pedal and cleat designs generally provide the expected performance characteristics expected by cyclists, it would be desirable to provide a new and potentially improved cleat and/or pedal that provide improved performance characteristics and features when compared to existing cleat/pedal designs.

SUMMARY OF THE INVENTION

According to a broad aspect of the present invention, there is provided a cycling footwear cleat for connection to a receiving portion of a pedal, the pedal having a mounting shaft to which the receiving portion of the pedal is rotatably mounted. The cleat includes a mount for mounting the cleat to an underside of cycling footwear, and an attachment portion for receipt by the receiving portion of the pedal. The cleat also includes a releasably mountable resilient member provided between the attachment portion and the receiving portion when the pedal is attached to the cleat. The resilient member resists movement of the attachment portion relative to the receiving portion and regulated bias between the cleat and the pedal. The resilient member is of a closed loop, closed band, or closed strap configuration received about a portion of the cleat or attachment portion.

Preferably, the cleat is releasably connectable to the pedal, although need not be so.

Reference is made above to 'cycling'. The cleat may be used in conjunction with a range of cycle types, such as a bicycle, a tricycle, a tandem bike, a recumbent bike, an electric bike, a unicycle, an exercise bike, a spinning bike or other type of stationary bike. That said, the invention is considered to have particular application in the context of footwear suitable for use on a bicycle, specifically a road bike, track bike, time trial bike, triathlon bike or commuting bike.

Reference to "footwear" is to be understood to include any suitable type of footwear currently used in conjunction with cycling cleats including, but not limited to, cycling shoes, cycling boots (such as those worn in cold weather conditions, and cycling sandals. That said, the invention is considered to have particular application in relation to footwear designed for road bike, track bike, triathlon bike, time trial bike or commuting bike use.

The resilient member preferably resists movement of the attachment portion relative to the receiving portion within a plane of movement, with the plane of movement extending in a direction being generally parallel to an axis of rotation of the receiving portion about the mounting shaft. Being resilient, the member desirably provides less freedom of movement of the cleat relative to the pedal when the load applied to the cleat by the cyclist is relatively low. However, the resilience of the member means that relative movement between the cleat and the pedal is desirably possible when the cyclist applies a relatively high load to the cleat. The natural resilience of the member also desirably returns the cleat to a neutral (or unloaded) position when the load applied to the cleat is removed. The provision of the resilient member is generally not intended to prevent float/movement of the cleat relative to the pedal cleat. Rather, it is intended to moderate the float/movement so as to potentially provide a range of possible benefits, including:

improving a cyclist's pedalling technique improving pedalling efficiency reducing the likelihood of knee and other injuries potentially reducing the energy expelled when cycling providing a desired amount of float/movement between the cleat and pedal when required reducing the rate of cleat wear providing an improved cleat interface with the pedal a more natural pedalling feel changing/improving cleat dynamics at different pedal/cleat RPM and load, and the resilience of the resilient member also provides a kinetic return of the cleat to its at rest position relative to the pedal when any load applied to the cleat by the cyclist is removed.

Reference is made above to 'a' plane of movement. It is to be appreciated that the orientation of the plane of movement relative to the axis of rotation will likely vary during the pedalling stroke as a result of the natural pedalling motion of a given cyclist. However, the plane of movement, at any given time, will always be generally parallel to the axis of rotation, as road cycling pedals and cleats are usually specifically designed to provide this type of relative movement or 'float' to account for anatomical differences between cyclists and their varying cycling styles. The provision of float between the cleat and pedal is also provided so as to limit knee injuries (and other potential injuries) that may be more likely to result from having a pedal/cleat combination providing no relative float there between. Thus, the plane of movement in the context of this specification is not to be considered as a fixed plane of movement, but should instead be considered from the point of view of any given instant in time during a given cyclist's pedalling motion.

The extent to which the resilient member resists the float between the cleat and pedal may be selected as desired. In some embodiments, no resistance may be provided proximate the neutral float position of the cleat relative to the pedal, with resistance being provided at or towards the outer limits of the available float. In other embodiments, resistance may be provided at any relative float position of the cleat relative to the pedal, except perhaps the neutral position. The resistance provided by the resilient member may increase (either linearly or non-linearly) in response to the amount of deformation experienced by the resilient member. Thus, the amount of resistance may be highest at or towards the outer limits of available float.

The resilient member has not been specifically designed to resist movement of the attachment portion of the cleat relative to the receiving portion of the pedal in a direction being generally perpendicular to the axis of rotation. Such movement may exist if the cleat and/or pedal contact surfaces were worn to the extent that there exists a freedom of movement between the pedal and cleat perpendicular to the axis of rotation. If such play exists then it is generally considered an opportune time for a cyclist to replace their cleats, and possibly also consider replacing their pedals if they have worn sufficiently. However, if desired, the resilient member may also be designed to resist at least a small amount of relative movement between the pedal and cleat in a direction generally perpendicular to the axis of rotation.

As stated previously, the provision of a resilient member has been found by the applicant to potentially improve a cyclist's pedalling efficiency, as well as allowing for variable float of the cleat within the pedal as and when required. It also potentially improves the control of pedal float, since the cleat is less likely to move in an uncontrolled motion relative to the pedal.

Preferably, the resilient member is releasably mounted to the cleat so that it may be replaced or removed if and when necessary. In other instances, it may be desirable for the resilient member to be permanently mounted to (or otherwise integrated with) the cleat as a permanent one-piece arrangement.

It is also envisaged that, in some embodiments of the invention, the resilient member may be mounted to the pedal, rather than to the cleat, either permanently mounted or releasably mounted. Thus, the invention may also extend to a unique pedal design.

The precise arrangement by which the resilient member is mounted to the cleat (or pedal) may be selected as desired, so long as it functions to resist movement of the attachment portion of the cleat relative to the receiving portion of the pedal within the plane of movement.

As previously mentioned, in one form of the invention, the resilient member is in the form of a closed loop, band or strap configuration received about a portion of the cleat or attachment portion. As one example, the resilient member may be generally in the form of an O-ring manufactured from a polymer, or other suitable resilient material. The specific size and shape of the resilient member may be selected as desired and may, at least in part, be dictated by the specific form of the cleat with which it is to be used. The O-ring may be of an at least substantially constant cross-sectional shape, although at least one embodiment includes a resilient member having one portion of a differing cross-sectional shape to the remaining portion of the O-ring. Thus, the term "O-ring", in the context of this specification, is understood not to be limited to O-rings of constant cross-sectional shape and/or size.

It is envisaged that the cleat preferably includes a seat for receiving the resilient member. The seat may be configured to receive the resilient member in a tensioned state, even if only in a slightly tensioned state, as the tension may act to retain the resilient member in its seated position.

In one form, the seat includes a slot portion or groove portion provided in the cleat for receiving at least part of the resilient member therein.

The resilient member may be configured such that it is mountable to the cleat in a double looped arrangement on or about at least part of the cleat. However, the applicant's current preference is for the resilient member to be mountable to the cleat in a single loop arrangement.

So far, the invention has been described in the context of a cleat including a resilient member. However, it is to be appreciated that the invention also contemplates a replacement resilient member for use with a cleat of the type described generally above. A replacement resilient member may be useful when replacing an existing resilient member fitted to the cleat that may be damaged or worn, or to replace an existing resilient member with one of differing physical properties. A replacement resilient member may also be useful in a situation where a cleat is initially provided without a resilient member, but where a resilient member may be optionally fitted.

It may be that the cleat according to the present invention may be used with the resilient member fitted in place, or may be used along the lines of a more conventionally designed cleat simply by removing the resilient member.

In accordance with another aspect of the present invention, there is provided a bicycle footwear cleat for connection to a receiving portion of a bicycle pedal, the bicycle pedal having a mounting shaft to which the receiving portion of the pedal is rotatably mounted. The cleat includes a mount for mounting the cleat to an underside of bicycle footwear and an attachment portion for receipt by the receiving portion of the pedal. The cleat also includes a resilient member receiving space provided between the attachment portion and the receiving portion (when the pedal is attached to the cleat) for receiving a resilient member in such a manner that the resilient member resists movement of the attachment portion relative to the receiving portion. The resilient member is of a closed loop, closed band, or closed strap configuration received about a portion of the cleat or attachment portion. In such an arrangement, the cleat may be initially provided without the resilient member fitted, with the resilient member being fitted if and when it is desired to utilise the benefits the resilient member.

The invention also pertains to a resilient member for use with a bicycle footwear cleat of the form broadly referred to in the preceding paragraph. Preferably, the resilient member is releasably mountable to the cleat. The resilient member may be generally in the form of an O-ring.

The resilient member may be receivable on, in or about the resilient member receiving space in the form of a seat provided on the cleat. In some forms of the invention, it may be desirable for the resilient member to be receivable on, in or about the seat in a tensioned state, even if only in a slightly tensioned state, such that the tension acts to retain the resilient member in its seated position. The resilient member may be receivable in a slot portion or groove portion of the seat. Further, the resilient member may be configured such that it is mountable to the cleat in a double looped arrangement, although at least one single loop arrangement is also contemplated.

In another embodiment of the invention, there is provided a cycling pedal including a receiving portion for receiving an attachment portion of a cleat, and a mounting shaft to which the receiving portion of the pedal is rotatably mounted. The pedal also includes a releasably mountable resilient member provided between the attachment portion and the receiving portion when the pedal is attached to the cleat. The resilient member resists movement of the attachment portion relative to the receiving portion and regulates bias between the pedal and the cleat. The resilient member is of a closed loop, closed band, or closed strap configuration received about a portion of the cleat or attachment portion.

With reference to the preceding paragraph, the resilient member preferably resists movement of the attachment portion relative to the receiving portion within a plane of movement, with the plane of movement extending in a direction being generally parallel to an axis of rotation of the receiving portion about the mounting shaft. The resilient member may be mounted to or mountable to the pedal. In one form, the resilient member is releasably mounted to or releasably mountable to the pedal.

In accordance with yet another embodiment of the present invention, there is provided a cycling pedal including a receiving portion for receiving an attachment portion of a cleat, and a mounting shaft to which the receiving portion of the pedal is rotatably mounted. The pedal also includes a resilient member receiving space provided between the attachment portion and the receiving portion when the pedal is attached to the cleat. The receiving space is provided for receiving a releasably mountable resilient member in such a manner that the resilient member resists movement of the attachment portion relative to the receiving portion and regulates bias between the pedal and the cleat. The receiving space is provided for receiving a resilient member in the form of a closed loop, closed band, or closed strap configuration received about a portion of the cleat or attachment portion.

With reference to the preceding paragraph, there is preferably provided a resilient member for use with the pedal, with the resilient member releasably mounted to or releasably mountable to the pedal.

BRIEF DESCRIPTION OF THE FIGURES

It will be convenient to hereinafter describe preferred embodiments of the invention with reference to the accompanying figures. The particularity of the figures is to be understood as not limiting the preceding broad description of the invention.

DETAILED DESCRIPTION OF THE DRAWINGS

Referring to FIGS. 1 to 4, there is illustrated a cycling footwear cleat 20 according to one embodiment of the present invention. The cleat 20 is specifically designed for use with a road bike shoe (not shown). However, the cleat 20 may also be used for other cycling disciplines including, but not limited to, track cycling, triathlon, time trial and commuting.

Reference throughout this specification (and claims) to the cleat 20 in the context of road bike use is provided so as to describe the invention. It is to be appreciated that reference herein to road bike use is not intended to limit the cleat 20 to only road bike use—the cleat 20 may also be used in a range of other cycling disciplines, including those referred to in the previous paragraph.

The cleat 20 includes a mount for mounting the cleat to an underside of the shoe. The mount is in the form of three mounting apertures 22, 24, 26 extending through the cleat 20 for receiving threaded fasteners 28 and associated rectangular washers 30 (only one of the three threaded fastener/washer combinations is shown) in a manner common to existing road bike cleat designs.

Each fastener 28 is receivable is a threaded bore extending inwardly from the underside of the associated shoe. Thus, it can be appreciated that the cleat 20 is retained in its mounted position to the underside of the bike shoe by tightening the three threaded fasteners 28 with an Allen key, flathead screwdriver or Phillips screwdriver depending on the head design of the fasteners 28.

The cleat 20 includes an attachment portion 32 for receipt by the receiving portion of the pedal. The attachment portion includes a front end section 34 and a rear end section 36. The attachment portion 32 is generally of a similar form to that of existing cleat designs.

One advantage of the cleat 20 is that it is configured for use with existing pedals. This is considered important, as a cyclist need only replace their existing cleats with a pair of cleats 20 to take advantage of the unique design, rather than also having to replace their pedals, which would add considerably to the changeover costs.

With the cleat 20 mounted in position to the underside of the shoe, the cyclist can then mount the associated bicycle and place his foot such that the front end section 34 is moved in a forwardly direction to locate within the receiving portion of the pedal, following which the rear end section 36 is pressed in a generally downwards direction, thereby snapping into position within the receiving portion of the pedal. Once this has been done the cleat 20 (and therefore also the associated shoe) is releasably connected to the pedal.

In this way, the cleat 20 remains connected to the pedal, until such time as the cyclist wishes to remove the cleat 20 from the pedal. The cyclist achieves this by moving their heal in a laterally outwards direction away from the bicycle, thereby disconnecting the cleat 20 from the pedal.

The cleat 20 also includes a resilient member 38 shown in the form of an O-ring. The applicant considers the provision of the resilient member 38 to be unique to their cleat 20. The resilient member may be receivable on, in or about the resilient member receiving space 41, which may be in the form of a seat 42, provided on the cleat 20.

The O-ring is manufactured from a suitable polymeric material (or other suitable resilient material).

The resilient member 38 extends in a double looped arrangement about the front end section 34 of the attachment portion 32. The fact that the resilient member 38 extends about the front portion 40 of the front end section 34 is to be noted, since it results in this portion of the resilient member 38 contacting the pedal when the cleat 20 is connected to the pedal. In so doing, the resilient member 38 resists movement of the attachment portion 32 relative to the receiving portion of the pedal. No such resistance would exist if the resilient member 38 was absent.

More specifically, the resilient member 38 has been designed to resist float. That is, the resilient member 38 resists movement of the attachment portion 32 relative to the receiving portion within a plane of movement X-Y (see FIG. 2) that extends in a direction being generally parallel to the axis of rotation of the receiving portion about the mounting shaft of the pedal. This plane of movement is usually most evident to a cyclist in the form of a generally arcuate movement A of the rear end section 36, which is inherent is most currently available road bicycle (and other) pedal/cleat combinations. This arcuate movement A (see FIG. 2) caters for the natural anatomical movement of a cyclist's knee during the pedalling motion. Without this inherent freedom of movement (or float) between the pedal and cleat, the cyclist would be more prone to a knee (or other injury) as a result of their foot not being provided with any lateral freedom of movement during the pedalling motion.

Figure 6A:
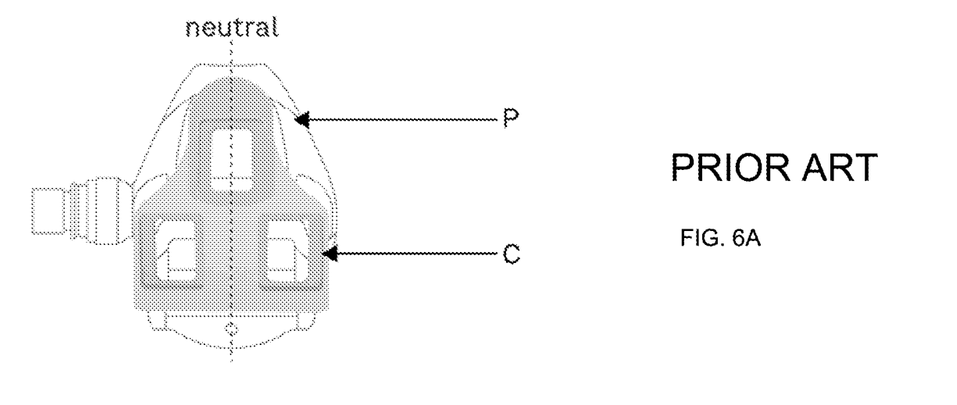
FIGS. 6a-c provide a plan view of a cleat and associated pedal, showing one example of the degree of float available between the cleat and pedal.
Figure 6B:
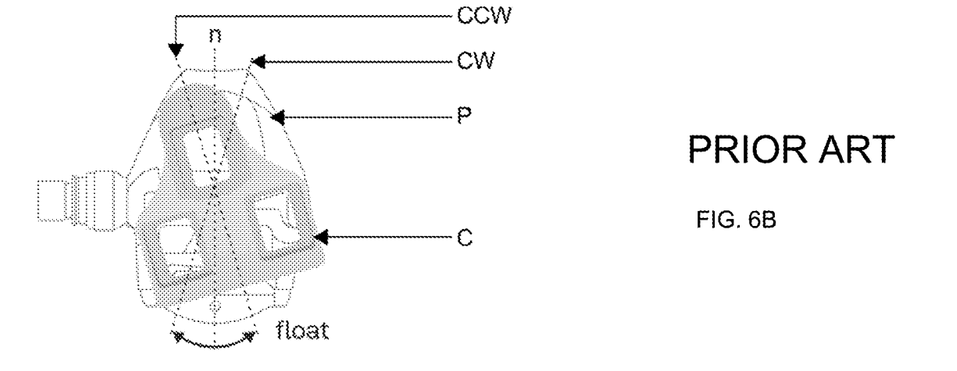
Figure 6C:
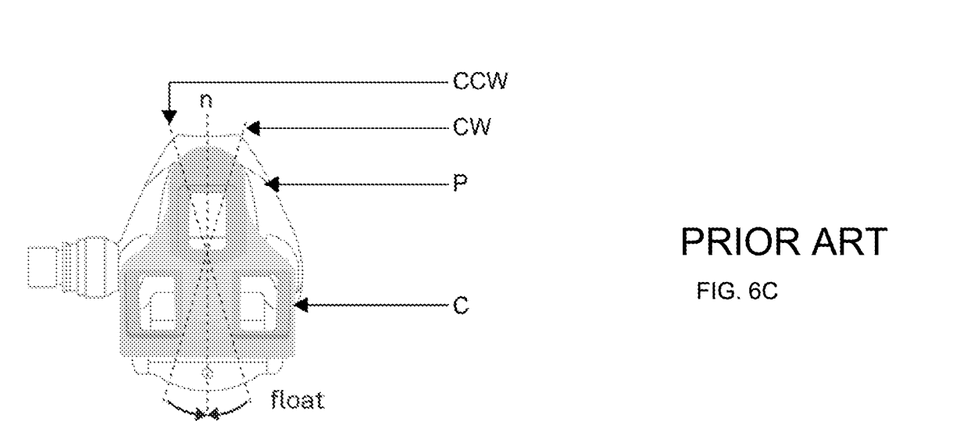
Figure 7:
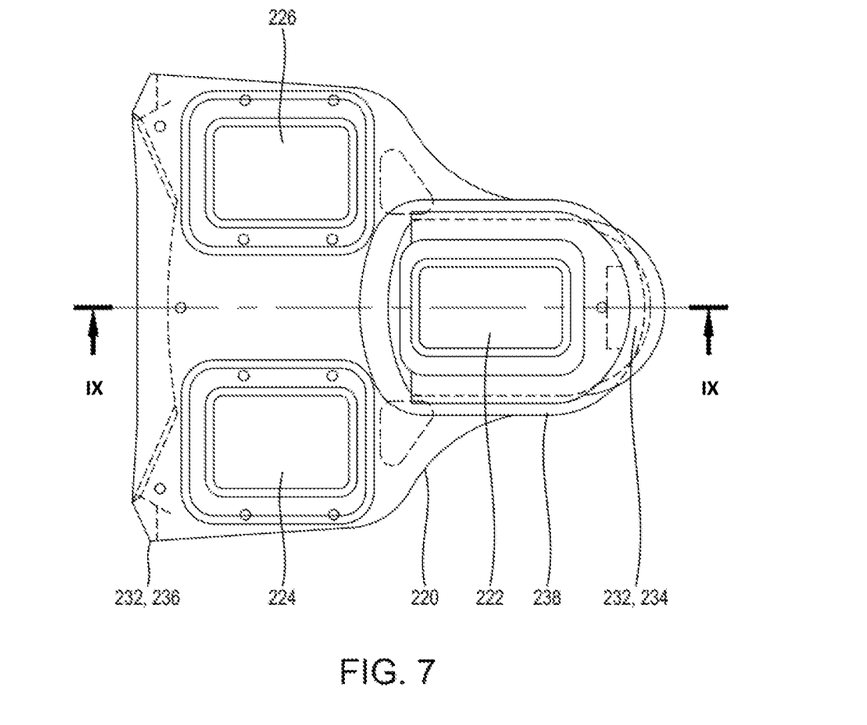
FIG. 7 is a plan view of a cycling footwear cleat according to a third embodiment of the present invention.
Figure 8:
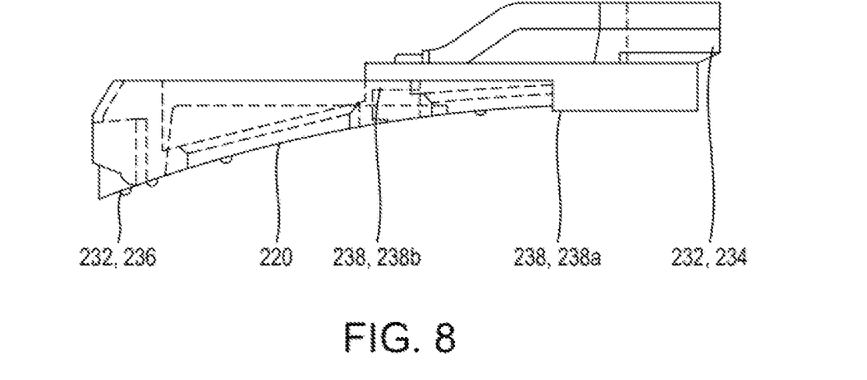
FIG. 8 is a side view of the cleat shown in FIG. 7.
Figure 9:
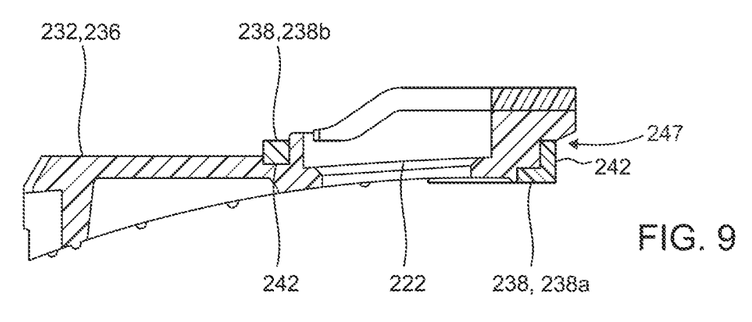
FIG. 9 is a sectional side view of the cleat shown in FIG. 7, along the line A-A.
Figure 10:
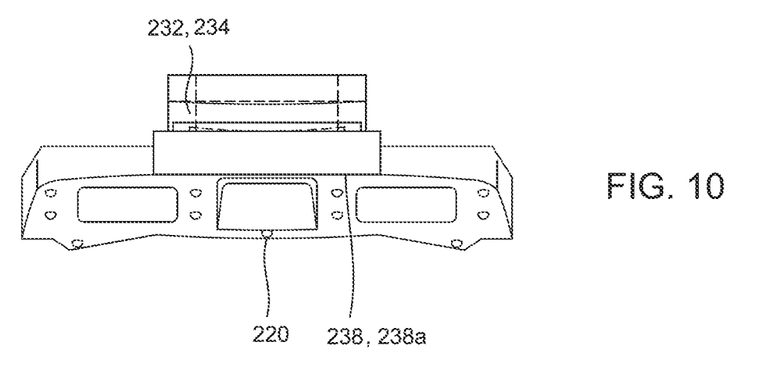
FIG. 10 is a front view of the cleat shown in FIG. 7.

The degree of float available may be as shown in FIGS. 6a to c, which illustrates a conventional cleat/pedal arrangement. In FIG. 6a, the cleat C is shown in a neutral position relative to the associated pedal P. In FIG. 6b, the pedal shows the maximum available amount of float (indicated by dashed line CCW) of the cleat C in the counter-clockwise direction relative to the Pedal P. It is to be appreciated that the cleat C may also be rotated in the clockwise direction a similar degree (due to the inherent float available) to that shown in FIG. 6b, as indicated by the dashed line CW.

Figure 1:
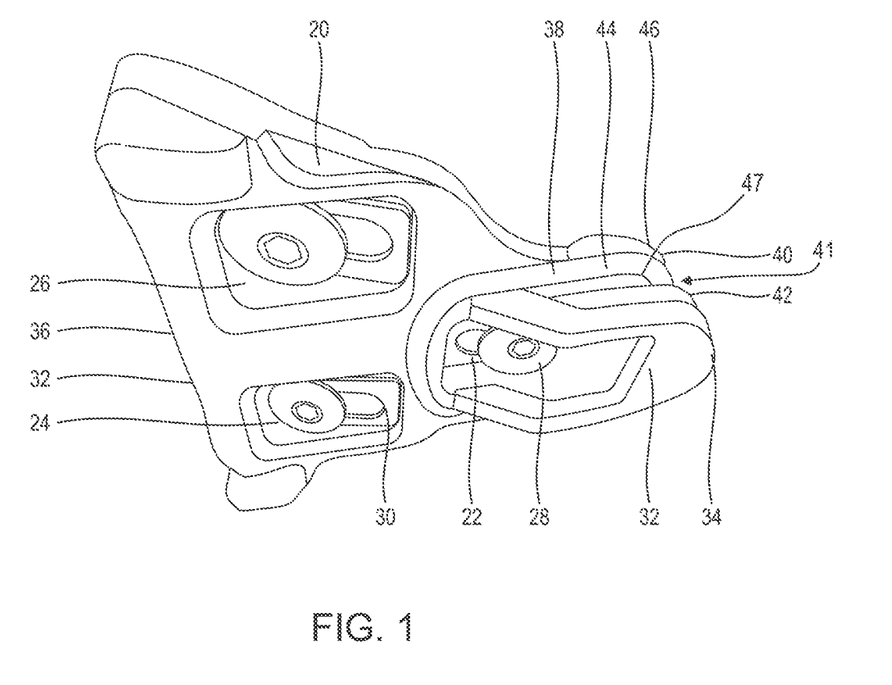
FIG. 1 is a perspective side view of a cycling footwear cleat according to one embodiment of the present invention.
Figure 2:
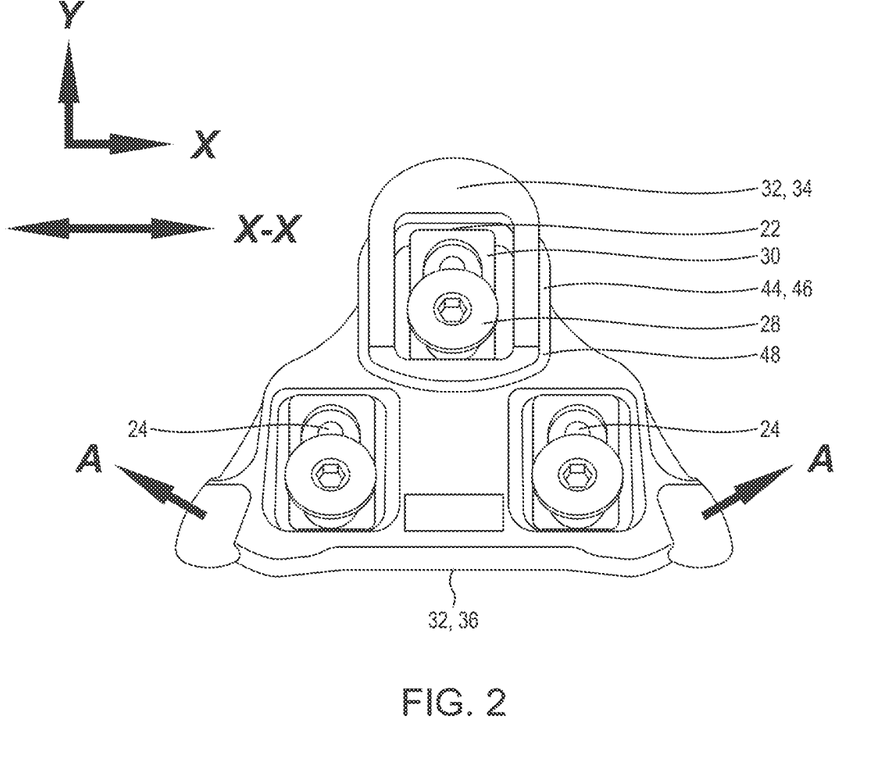
FIG. 2 is a plan view of the cleat shown in FIG. 1.
Figure 3:
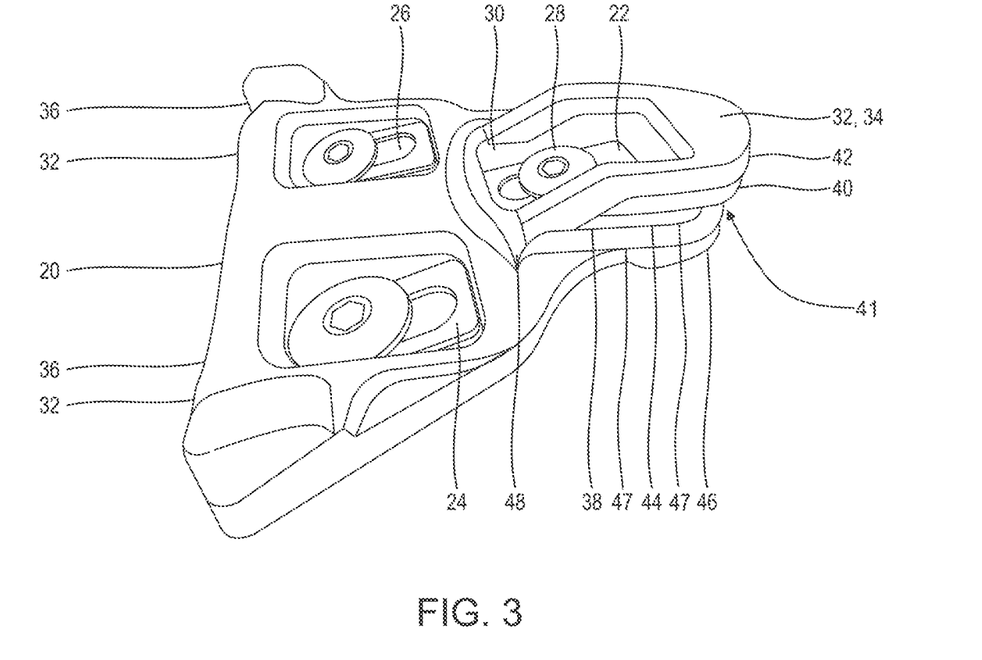
FIG. 3 is another perspective side view of the cleat shown in FIG. 1.
Figure 4:
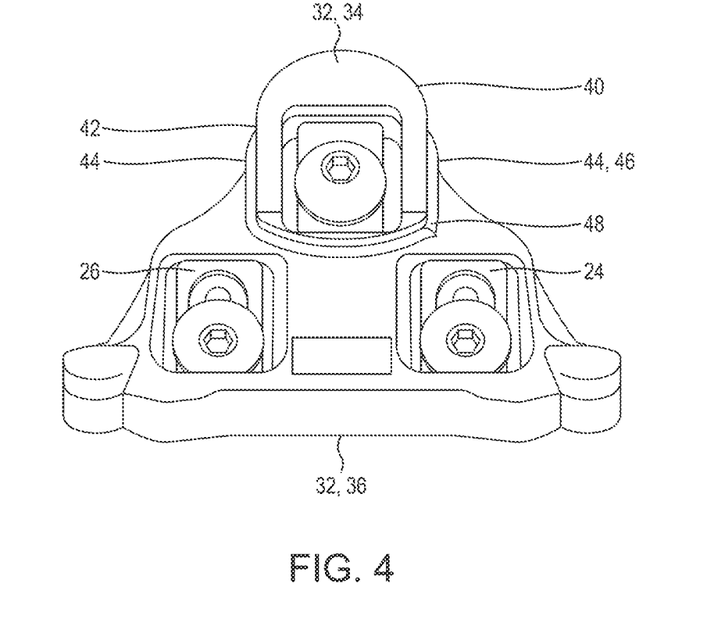
FIG. 4 is a perspective end view of the cleat shown in FIG. 1.

The pedal isn't shown in FIGS. 1 to 4, although the axis of rotation X-X (which is coaxial with the pedal mounting shaft that mounts the pedal to the bicycle crank)—see FIG. 2—is shown in its approximate location when the cleat 20 is connected to the pedal.

It is to be appreciated that the resilient member 38 is releasably mounted to the cleat 20. This is desirable, as it allows for replacement of the resilient member 38 in the event that it sustains damage or wear. The cleat 20 may be sold with several replacement resilient members. The resilient members may also be sold separately as replacement parts. The resilient member 38 may also be potentially retrofittable to at least some existing cleat designs with no modification (or at least minimal modification) of the cleat required.

It can be seen that the cleat 20 includes a seat 42 for receiving the resilient member 38. The resilient member 38 may be receivable in a slot portion or groove portion 47 of the seat 42. As stated previously, the seat 42 may be configured to receive the resilient member 38 in a tensioned state, even if only in a slightly tensioned state, as the tension may act to retain the resilient member 38 in its seated position.

As stated previously, the illustrated embodiment of FIGS. 1 to 4 shows the seat 42 receiving the resilient member 38 in a double looped arrangement. The first loop 44 is visible in its entirety; whereas the second loop 46 is only partly visible. The portion of the second loop 46 not visible extends between the cleat 20 and the underside of the shoe. The first and second loops 44, 46 are integrally formed. In essence, the resilient member 38 is simply doubled over to create the two loops 44, 46. An aperture 48 extends through the cleat 20, through which is fed the resilient member 38 when being fitted in position. The fact that the resilient member 38 is fed through the aperture 48 desirably prevents the resilient member 38 inadvertently becoming detached from the cleat 20 during use.

It is to be appreciated that the illustrated resilient member 38 of FIGS. 1 to 4 is shown in a doubled over configuration. However, the resilient member 38 and/or cleat 20 may be redesigned such that the resilient member 38 need not be doubled over when fitted to the cleat 20. In a yet further embodiment two (or more) smaller resilient members may be fitted to the cleat 20 in place of the doubled over resilient member 38 shown.

It is conceivable that replacement resilient members may be provided in any one of a range of possible elastomeric properties for providing a desired cleat performance. This may be done in part to suit a rider's ability, riding style, physiology, desired performance characteristics of the pedal/cleat combination, and/or specific cleat and pedal designs.

If desired, the cleat 20 may be used with the resilient member 38 fitted in place, or may be used along the lines of a more conventionally designed cleat, simply by removing the resilient member 38.

Figure 5:
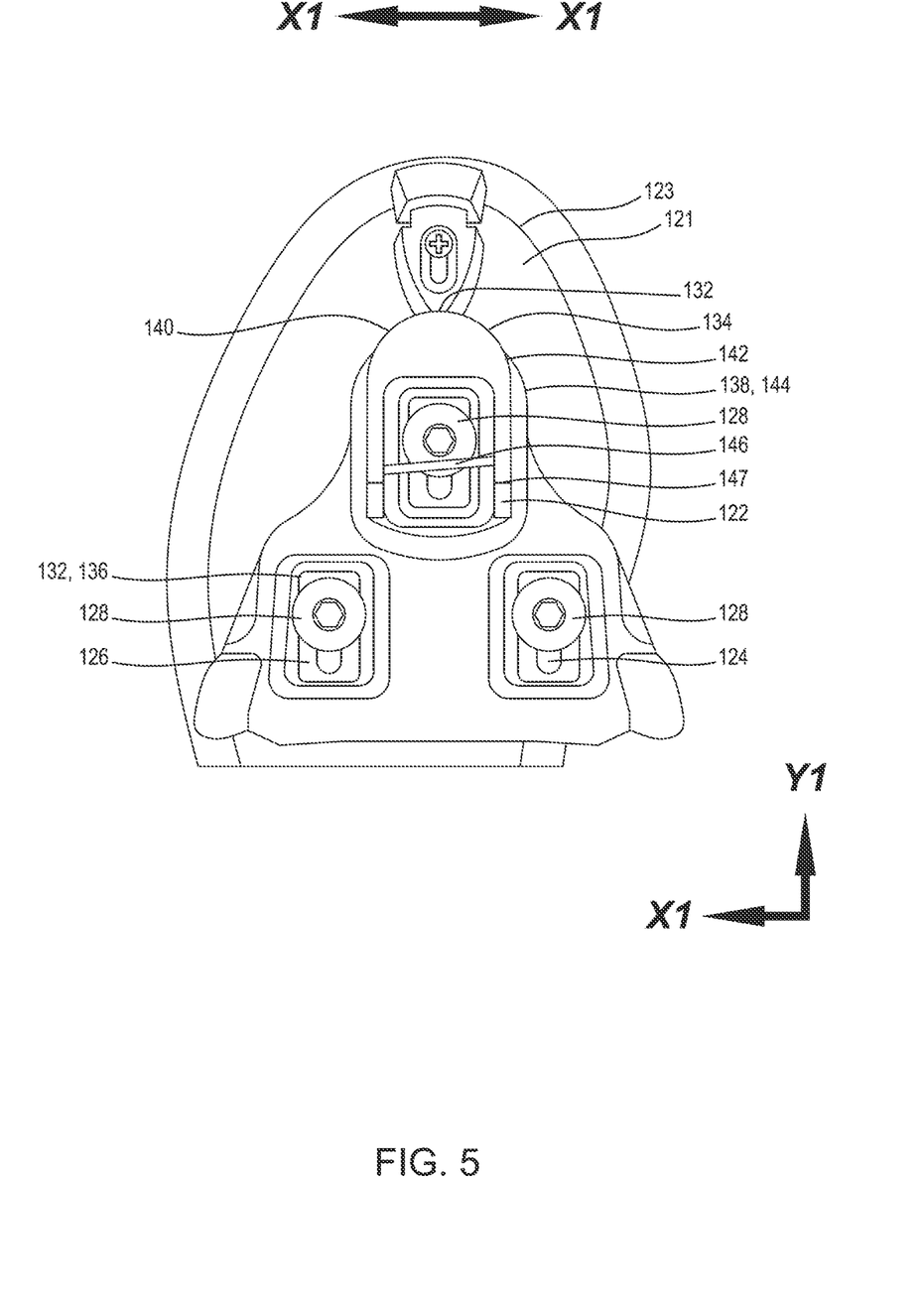
FIG. 5 is a plan view of a cycling footwear cleat according to a second embodiment of the present invention, and when mounted to the underside of a road bike shoe.

Referring to FIG. 5, there is shown a cleat 120 according to a second embodiment of the invention. As with the cleat 20 shown in FIGS. 1 to 4, the cleat 120 shown in FIG. 5 is specifically designed for use with a road bike/track bike/time trial bike/triathlon bike shoe 121.

The cleat 120 is shown mounted to the underside 123 of the shoe 121. Mounting of the cleat 120 on the shoe 121 is by way of the threaded fasteners 128 received in respective mounting apertures 122, 124, 126 extending through the cleat 120. The fasteners 128 are received in threaded bores provided in the underside 123 of the shoe 121, and in a manner common to existing road bike cleat mounting arrangements.

The cleat 120 includes an attachment portion 132 for receipt by the receiving portion of the pedal. The attachment portion 132 includes a front end section 134 and a rear end section 136, generally of the form of existing cleat designs.

Like cleat 20, cleat 120 is configured for use with existing pedals, which is considered important, as a cyclist needs only to replace their existing cleats with a pair of cleats 120 to take advantage of the present invention, rather than also having to replace their pedals, which would add considerably to the changeover costs.

With the cleat 120 mounted in position to the underside of the shoe 121, the cyclist can then mount the associated bicycle and place his foot such that the front end section 134 is moved in a forwardly direction to locate within the receiving portion of the pedal, following which the rear end section 136 is pressed in a generally downwards direction, thereby snapping into position within the receiving portion of the pedal. Once this has been done, the cleat 120 (and therefore also the shoe 121) is releasably connected to the pedal.

In this way, the cleat 120 remains connected to the pedal, until such time as the cyclist wishes to remove the cleat 120 from the pedal. The cyclist achieves this by moving the shoe heel in a laterally outwards direction away from the bicycle, thereby disconnecting the cleat 120 from the pedal.

The cleat 120 also includes a resilient member 138 shown in the form of an O-ring manufactured from a suitable polymeric material (or other suitable material).

The resilient member 138 functions substantially identically to the resilient member 38 shown in FIGS. 1 to 4. The resilient member 138 is releasably mounted to the cleat 120, so as to allow for replacement of the resilient member 138 in the event that it sustains damage or wear.

One difference between the resilient members 38 and 138 is in their seated positions relative to their respective cleat 20/120.

The resilient member 138 extends in a double looped arrangement about the front end section 134 of the attachment portion 132, thereby contacting the pedal when the cleat 120 is releasably connected to the pedal. In so doing, the resilient member 138 resists movement in a direction X1-Y1 generally parallel to the axis of rotation X1-X1 of the pedal.

The first loop 144 wraps around the front end section 134 of the cleat 120; and the second loop 146 part-wraps around the forward portion 140 of the front end section 134. The remainder of the second loop 146 is located within slots 147 provided in the cleat 120 and within the washer 149—a fastening arrangement (not shown) may be used to secure this portion of the resilient member 138 in position relative to the cleat 120, if desired, so as to assist in preventing the resilient member 138 inadvertently becoming detached from the cleat 120 during use.

It can be seen that the cleat 120 includes a seat 142 for receiving the resilient member 138. The seat 142 may be configured for receiving the resilient member 138 in a tensioned state (even if only in a slightly tensioned state), as the tension may act to retain the resilient member 138 in its seated position.

If desired, the cleat 120 may be used with the resilient member 138 fitted in position, or may be used along the lines of a more conventionally designed cleat simply by removing the resilient member 138.

Referring to FIGS. 7 to 10, there is shown a cleat 120 according to a third embodiment of the invention. As with the cleat 20 shown in FIGS. 1 to 4, the cleat 220 shown in FIGS. 7 to 10 is specifically designed for use with a road bike/track bike/time trial bike/triathlon bike shoe (not shown).

Mounting of the cleat 220 on a shoe is by way of the threaded fasteners received in respective mounting apertures 222, 224, 226 extending through the cleat 220. The fasteners are received in threaded bores provided in the underside of the shoe, and in a manner common to existing road bike cleat mounting arrangements.

The cleat 220 includes an attachment portion 232 for receipt by the receiving portion of the pedal. The attachment portion 232 includes a front end section 234 and a rear end section 236, generally of the form of existing cleat designs.

Like cleats 20 and 120, cleat 220 is configured for use with existing pedals, which is considered important, as a cyclist needs only to replace their existing cleats with a pair of cleats 220 to take advantage of the present invention, rather than also having to replace their pedals, which would add considerably to the changeover costs.

With the cleat 220 mounted in position to the underside of the shoe, the cyclist can then mount the associated bicycle and place his foot such that the front end section 234 is moved in a forwardly direction to locate within the receiving portion of the pedal, following which the rear end section 236 is pressed in a generally downwards direction, thereby snapping into position within the receiving portion of the pedal. Once this has been done, the cleat 220 (and therefore also the shoe) is releasably connected to the pedal.

In this way, the cleat 220 remains connected to the pedal, until such time as the cyclist wishes to remove the cleat 220 from the pedal. The cyclist achieves this by moving the shoe heel in a laterally outwards direction away from the bicycle, thereby disconnecting the cleat 220 from the pedal.

The cleat 220 also includes a resilient member 238 shown in the form of an O-ring manufactured from a suitable polymeric material (or other suitable material). It is to be appreciated that O-ring is of non-uniform cross-section, with the front portion 238*a* being thicker than the rear portion 238*b*.

The resilient member 238 functions substantially identically to the resilient member 38 shown in FIGS. 1 to 4. The resilient member 238 is releasably mounted to the cleat 220, so as to allow for replacement of the resilient member 238 in the event that it sustains damage or wear.

One difference between the resilient members 38 and 238 is in their seated positions relative to their respective cleat 20/220.

The resilient member 238 extends in a single-loop arrangement about the front end section 234 of the attachment portion 232, thereby contacting the pedal when the cleat 220 is releasably connected to the pedal. In so doing, the resilient member 238 resists movement in a direction X1-Y1 generally parallel to the axis of rotation X1-X1 of the pedal.

It can be seen (particularly in FIG. 9) that the cleat 220 includes a seat 242 for receiving the resilient member 238 in a single-loop arrangement (rather than a double-loop arrangement). The resilient member 238 may be receivable in a slot portion or groove portion 247 of the seat 242. The seat 242 may be configured for receiving the resilient member 238 in a tensioned state (even if only in a slightly tensioned state), as the tension may act to retain the resilient member 238 in its seated position.

If desired, the cleat 220 may be used with the resilient member 238 fitted in position, or may be used along the lines of a more conventionally designed cleat simply by removing the resilient member 238.

The cleats 20/120/220 may be adorned with a distinctive colour/colour combination or other distinctive finish to provide an easily identifiable product in the marketplace and when in use. The applicant is currently contemplating producing their cleats 20/120/220 in the colour green A range of potential benefits are desirably provided by the cleat 20, 120, 220 and/or pedal the subject of this application when compared to existing cleat/pedal designs. As stated previously, these potential benefits include:

improving a cyclist's pedalling technique improving pedalling efficiency reducing the likelihood of knee and other injuries reducing the energy expelled when cycling providing a desired amount of float/movement between the cleat and pedal when required reducing the rate of cleat wear, and possibly also pedal wear providing an improved cleat interface with the pedal
a more natural pedalling feel
changes in/improvements to cleat dynamics at different pedal/cleat RPM and load, and
the resilience of the resilient member also provides a kinetic return of the cleat to its at rest position relative to the pedal.

It is to be understood that various alterations, modifications and/or additions may be introduced into the construction and arrangement of the parts previously described without departing from the spirit or ambit of this invention.

The invention claimed is:

1. A cycling footwear cleat for connection to a pedal, the cleat comprising:
   a mounting aperture for mounting the cleat to an underside of a cycling footwear;
   an attachment portion for receipt by the pedal;
   a releasably mounted resilient member in the form of a closed loop, closed band or closed strap configuration, the releasably mounted resilient member is associated with the attachment portion and for interacting with the pedal when the pedal is attached to the cleat, wherein the resilient member resists movement of the attachment portion relative to the pedal, and moderates the movement of the cleat relative to the pedal; and
   the releasably mounted resilient member is received in a resilient member receiving space, the resilient member receiving space extending about the attachment portion of the cleat, wherein
   the resilient member receiving space comprises a seat in the form of a slot portion or groove portion provided about the attachment portion of the cleat.

2. A cycling footwear cleat according to claim 1, wherein the resilient member is generally in the form of an O-ring of substantially constant or variable cross-sectional size and/or shape.

3. A cycling footwear cleat according to claim 1, wherein the seat is configured to receive the resilient member in a tensioned state.

* * * * *